United States Patent [19]
Friedrich et al.

[11] Patent Number: 5,785,092
[45] Date of Patent: Jul. 28, 1998

[54] HIGH-PRESSURE FIBER REINFORCED COMPOSITE PIPE JOINT

[75] Inventors: Ralph Friedrich, Hermosa Beach; Ming Kuo, Cerritos; Kevin Smyth, Whittier, all of Calif.

[73] Assignee: Ameron International Corporation, Pasadena, Calif.

[21] Appl. No.: 556,447

[22] Filed: Nov. 15, 1995

Related U.S. Application Data

[62] Division of Ser. No. 327,616, Oct. 24, 1994, Pat. No. 5,520,422.

[51] Int. Cl.$^6$ ........................................ F16L 11/00
[52] U.S. Cl. ..................... 138/133; 138/109; 138/129; 138/172; 285/423
[58] Field of Search .............................. 138/133, 132, 138/134, 144, 129, 130, 153, 154, 140, 172, 174, 177, 109; 285/423, 333, 318, 95, 305

[56] References Cited

U.S. PATENT DOCUMENTS

| | | | |
|---|---|---|---|
| 133,219 | 11/1872 | Gately. | |
| 1,314,670 | 9/1919 | Juve et al. | |
| 1,394,300 | 10/1921 | Gammeter. | |
| 1,831,724 | 11/1931 | Stokes. | |
| 2,341,670 | 2/1944 | Stinson | 285/146 |
| 2,418,418 | 4/1947 | Martin et al. | 170/173 |
| 2,640,501 | 2/1953 | Scott et al. | 138/56 |
| 2,911,236 | 11/1959 | Thibault | 285/149 |
| 3,559,693 | 2/1971 | Reynard | 138/133 |
| 3,790,438 | 2/1974 | Lewis et al. | 161/172 |
| 3,814,138 | 6/1974 | Courtot | 138/132 X |
| 4,351,364 | 9/1982 | Cocks | 138/133 |
| 4,647,080 | 3/1987 | Sandt et al. | 285/146 |
| 4,657,049 | 4/1987 | Fourty et al. | 138/133 |
| 4,943,094 | 7/1990 | Simmons | 285/333 |
| 5,072,759 | 12/1991 | Moore | 138/133 X |
| 5,106,130 | 4/1992 | Ellsworth et al. | 285/355 |
| 5,279,596 | 1/1994 | Castaneda et al. | 138/133 X |
| 5,341,849 | 8/1994 | Mang | 138/133 |

FOREIGN PATENT DOCUMENTS

| | | |
|---|---|---|
| 6726365 | 6/1967 | Australia. |
| 8024475 | 12/1975 | Australia. |
| 0157971 | 10/1985 | European Pat. Off.. |
| 747194 | 3/1956 | United Kingdom. |
| 898194 | 6/1962 | United Kingdom. |
| 1407913 | 10/1975 | United Kingdom. |
| WO94 413993 | 6/1994 | WIPO. |

*Primary Examiner*—Patrick F. Brinson
*Attorney, Agent, or Firm*—Christie, Parker & Hale, LLP

[57] ABSTRACT

A pipe joint for fiber reinforced composite pipe has internal and external matching tapers with a low taper angle. A half round helical groove is formed in each of the internal and external tapers for receiving several turns of a ductile key. The pipe joint is usable on high strength lightweight fiber reinforced composite pipe having helically wound steel strips embedded in the fiber reinforced resin. The pipe joint on such pipe is on an enlarged portion of glass fiber reinforced composite built up on an end of the pipe. The steel strips are terminated at differing distances from the end of the pipe joint and the ends of all of the steel strips are completely embedded in the fiber reinforced resin.

10 Claims, 4 Drawing Sheets

HIGH-PRESSURE FIBER REINFORCED COMPOSITE PIPE JOINT

This is a division of application Ser. No. 08/327,616 filed Oct. 24, 1994, now U.S. Pat. No. 5,520,422.

BACKGROUND

This invention concerns a high strength fiber reinforced pipe containing embedded steel strips.

Fiber reinforced composite pipe finds appreciable utility where corrosive materials are carried in a pipeline or where the pipeline is buried or laid on the sea floor or is otherwise subjected to an external corrosive environment. Techniques have been developed for producing fiber reinforced pipe for carrying high internal pressures. For example, until recently a typical high pressure pipe might have a 10 cm nominal diameter and an internal burst pressure of about 600 bar. More recently, fiber reinforced high pressure pipes with a 20 cm nominal diameter have been rated at about 1200 bar burst pressure.

Such fiber reinforced composite pipe, when reinforced with glass fibers, may have a wall thickness on the order of 5 cm, which clearly makes it costly and heavy. There is currently development of another variety of high pressure pipe which includes helically wound steel strips embedded in fiber reinforced resin. Such an embodiment has such good strength that the wall thickness may be as little as 7 mm for a 25 cm nominal diameter pipe. Such a pipe is described and illustrated in U.S. Pat. No. 4,351,364, for example.

A substantial concern in such high strength pipe, either fiber wound or with steel reinforcement, is the coupling or joint between adjacent pipes. The pipe joint needs to have a circumferential burst strength at least as great as, and preferably more than, the principal length of pipe. More significantly, the joint must have sufficient longitudinal shear strength to prevent the pipes from separating under internal pressure or other axial loads. Preferably the joints are designed to have sufficient longitudinal shear strength that they will not fail before rupture of the pipe itself.

Design of a suitable joint for fiber reinforced composite pipe differs appreciably from metal since the fiber reinforced composite pipe, as contrasted with steel, for example, has very little ductility. This places significant limitations on what can be done in pipe joints. In a conventional bell and spigot joint secured by filling the joint with adhesive, the high stiffness of the adherent places a high shear stress on adhesive in the joint. The distribution of stress along the joint is not uniform. The shear stress is quite high at the ends of the adhesive, as much as three times the average stress, and decreases rapidly from the ends toward the middle. In a long adhesive joint, the shear stress in the middle of the joint may be near zero.

The high stress at the ends of adhesive in such a lap shear joint can result in failure of the adhesive in shear adjacent to an end of the joint. This simply transfers the shear stress further along the joint and there is progressive failure at average stresses that would appear to be well within the capability of the adhesive.

Other joints for fiber reinforced pipe are also difficult because of the stiffness of the fiber reinforced composite. It is desirable to provide a pipe joint that redistributes stress along the length of the joint to avoid such progressive failure of the joint. Preferably the joint has a higher strength than the wall of the pipe remote from the joint. The pipe joint should have a high safety margin, i.e. a failure stress greater than the rated capability of the joint. The joint should be easily and economically assembled in field conditions.

BRIEF SUMMARY OF THE INVENTION

There is therefore provided in practice of this invention according to the presently preferred embodiment, a fiber reinforced composite pipe including helically wound steel strips embedded in the resin. In such a joint, the steel strips end within the pipe joint and at different distances from the end of the pipe joint.

DRAWINGS

These and other features and advantages of the present invention will be appreciated as the same becomes better understood by reference to the following detailed description when considered in connection with the accompanying drawings, wherein.

DESCRIPTION

Figure 1:
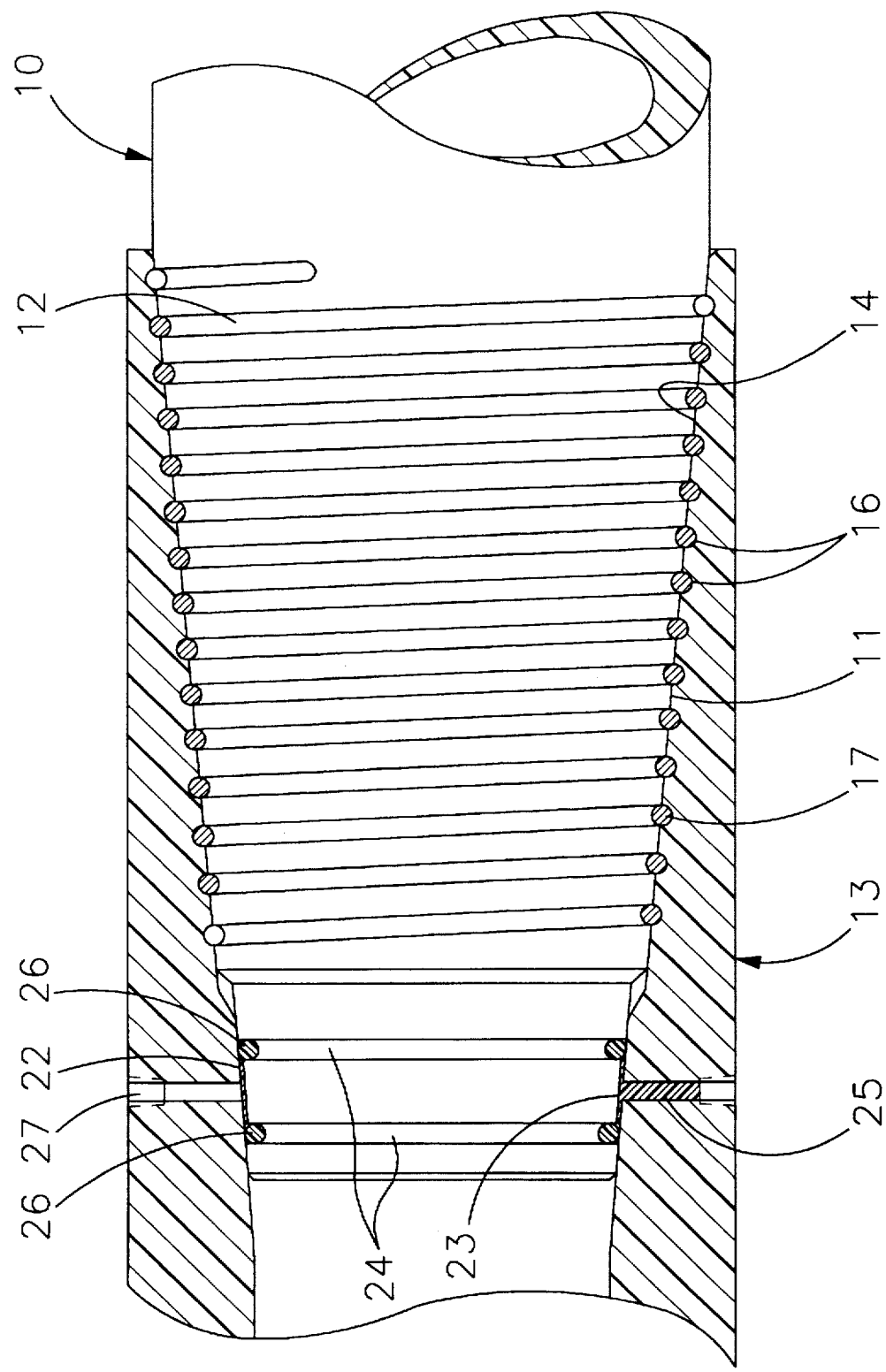
FIG. 1 is an exemplary fiber reinforced composite pipe joint with the outer coupling being in longitudinal cross section.

This application is a division of U.S. patent application Ser. No. 08/327,616, which concerns a pipe joint. The subject matter of the parent application is hereby incorporated by reference.

A typical pipe joint has an inner member of fiber reinforced composite pipe 10 such as is conventionally made of epoxy resin reinforced with helically wound glass fibers. These are conventional pipes, albeit with a thick wall for withstanding high internal pressures. A high pressure pipe having a nominal inside diameter of about 20 cm may have a wall thickness of about 5 cm. The pipe has an external taper 11 adjacent its end. A half-round groove 12 extends helically along the length of the external taper. (It will be recognized that the "helical" groove in the tapered surface is not a cylindrical helix but instead has the same taper as the tapered surface 11 and a uniform depth throughout the length of the groove.)

The external taper on the pipe fits into a coupling 13 having an internal taper 14 matching the external taper on the pipe. The internal taper also has a half-round groove 16 with the same pitch as the groove on the pipe. In this description, the outer member of the pipe joint combination is referred to as a "coupling" since that is a usual embodiment for a pipe joint. Alternatively, one may make a pipe with an external taper on one end and an internal taper on the other end and for purposes of this description, the end with an internal taper would be referred to as a "coupling". The "coupling" may be in any of a broad variety of pipe fittings such as valves, flange transition fittings, unions, etc. In one type of pipe for which this invention is useful, there are external tapers at both ends of each length of pipe and adjacent pieces of pipe are interconnected by a short coupling having two internal tapers.

The internal and external tapers are interconnected by a round ductile key member 17, half of which lies in each of the half-round grooves on the internal and external tapers respectively. A suitable material for a key comprises nylon or similar ductile, relatively strong plastic.

It is preferred to place the key inside the internal taper for ease of assembling and disassembling the joint. The external taper threading into the internal taper tends to force the key outwardly and permit free insertion of the pipe into the coupling. If a key firmly on the pipe were used, the joint could be self-locking and it could be difficult to fully tighten the joint. Likewise, the key in the coupling tends to be self releasing from the pipe when the joint is unthreaded.

The key in the tapered pipe joint does not provide a fluid tight seal. A seal is provided by an adhesive elastic sealant 25 between an external sealing surface 22 on the pipe and a facing internal sealing surface 23 in the coupling. In the illustrated embodiment, the sealing surfaces have the same taper at a four degree half angle as provided on the tapered surfaces forming the mechanical pipe joint.

A pair of circumferential O-ring grooves 24 straddling the sealing surface near the end of the pipe accommodate elastomeric O-rings 26 which seal against the facing sealing surface within the coupling. After the joint is assembled, a liquid sealant may be injected through one of a pair of passages 27 through the wall of the coupling. The second passage serves as an air vent and indicates when the sealant has filled the space between the sealing surfaces. The elastomeric O-rings retain the sealant within that space while it is liquid before curing. The O-rings also serve as a buffer at each end of the sealant within the annular sealing space for minimizing shear strain and keeping the sealant from shearing from the facing surfaces.

Figure 2:
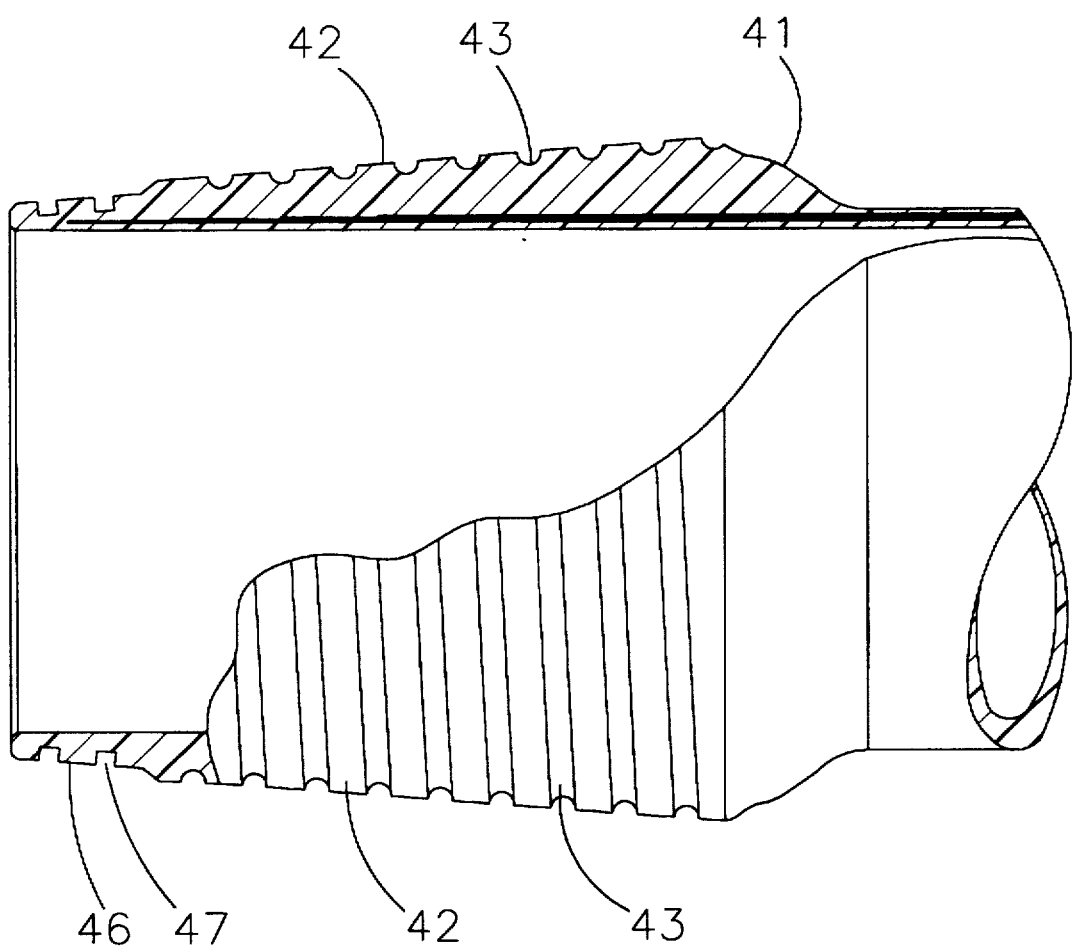
FIG. 2 is a side view of the inner member of a joint partially in longitudinal cross section for a second embodiment of fiber reinforced composite pipe with embedded steel strips.
Figure 3:
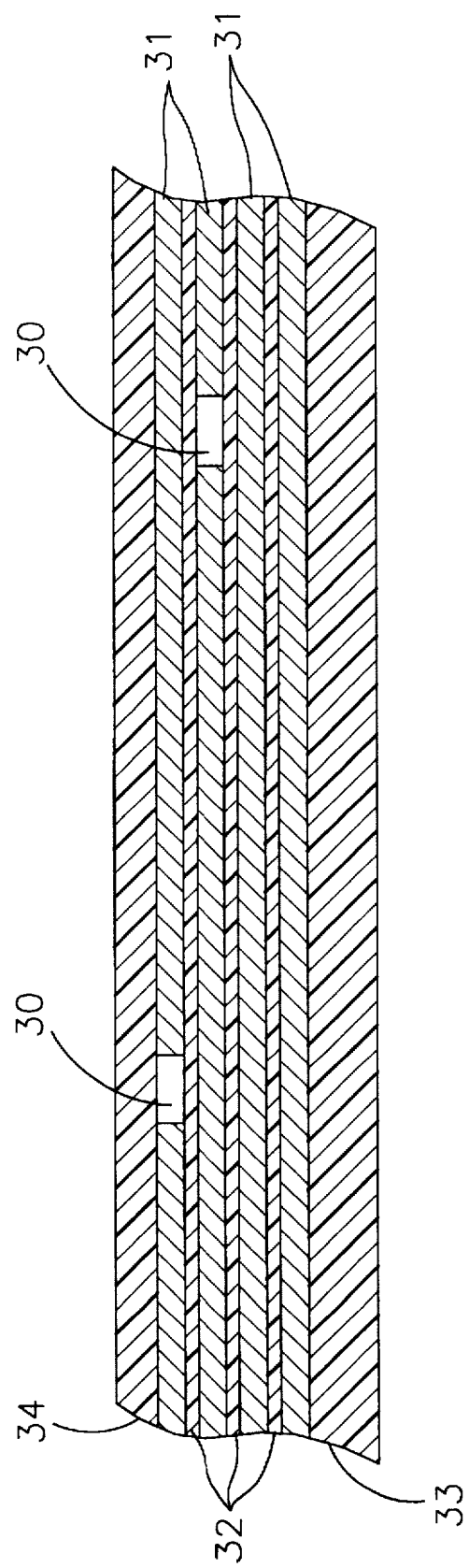
FIG. 3 is a fragmentary longitudinal cross section of the pipe of FIG. 2 at a location away from the pipe joint.
Figure 4:
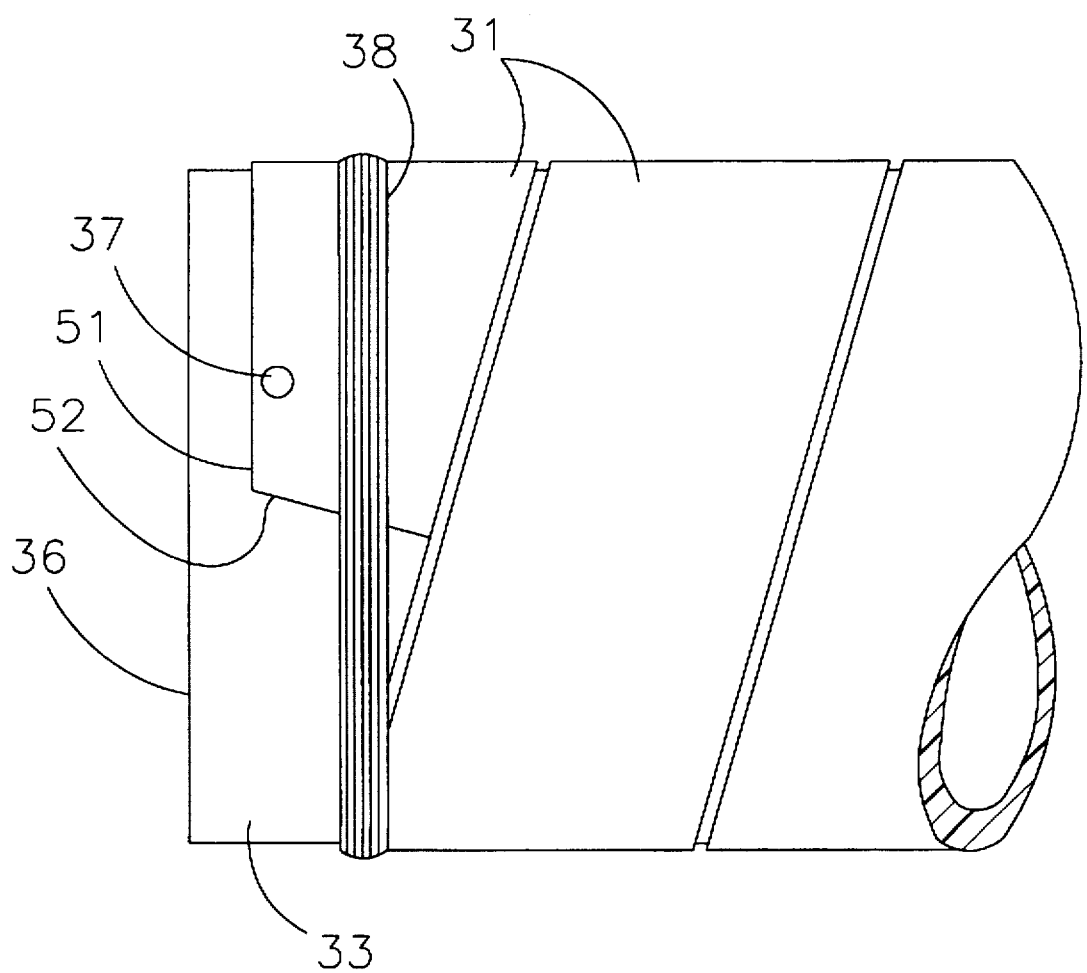
FIG. 4 is a side view of an end portion of the pipe of FIG. 2 in an intermediate stage of manufacture.

A second embodiment of pipe joint illustrated in FIGS. 2 to 4 is described before describing functioning of the pipe joint. In this embodiment, the fiber reinforced composite pipe also comprises a plurality of helically wound steel strips embedded in the wound fiber reinforcement. The end of such a pipe with a pipe joint is illustrated in FIG. 2 with a portion illustrated in longitudinal cross section. FIG. 3 is a fragmentary longitudinal cross section of the wall of the pipe significantly enlarged to show detail. FIG. 4 illustrates the end of the pipe in an intermediate stage in its manufacture. The drawing is as if some of the outer layers of the pipe were peeled away.

This moiety of the pipe joint mates with a coupling (not shown) having an internal taper generally similar to the pipe coupling illustrated in FIG. 1, except that the dimensions and geometry match the external dimensions of the pipe joint moiety illustrated in FIG. 2.

The principal portion of the length of the pipe, i.e., away from the pipe joint, includes four steel strips 31. The steel strips are too thin to illustrate in cross section in FIG. 2 but are illustrated in the fragmentary cross section of FIG. 3. In an exemplary embodiment of pipe having a nominal 25 cm diameter, there are four steel strips helically wound within the fiber reinforced composite. Each strip is from 10 to 15 cm wide and has a thickness of about 0.5 mm. The strips are helically wound with the edges in close proximity, typically 2 mm or less. Successive strips are staggered so that the gaps 30 between the edges of the strips are not aligned. A thin layer 32 of epoxy resin (about 50 gm) is between each adjacent pair of steel strips. Inwardly from the innermost steel strip, there is a layer 33 of glass, fiber reinforced epoxy with a thickness of about 2.5 mm. On the outer wall of the pipe, outwardly from the steel strips, there is another layer 34 of glass fiber reinforced epoxy having a thickness of about 1.5 mm. Thus, the steel strips are completely embedded in the fiber reinforced composite.

FIG. 4 illustrates an end of the pipe with outer layers peeled away showing essentially the innermost layer 33 of fiber reinforced composite and the innermost layer of helically wound steel strip 31. The end of the steel strip is cut off at the helix angle of the strip winding so that the cut 51 edge is parallel to the end 36 of the pipe. The otherwise sharp point on the end of the strip is likewise cut off along an edge 52. There is a hole 37 near the centerline of the strip near the end for receiving a tooling pin (not shown) to hold the end of the strip during winding. After the layer of steel strip is wound, a circumferential winding of glass rovings 38 is wrapped over the end portion of the strip to secure it in place while subsequent steel strips and the outer layer of fiber reinforced resin are added.

The next overlying steel strip is helically wound with the same helix angle and the same direction of winding. The end of the overlying steel strip, however, is cut off at a longer distance from the end of the pipe than the innermost layer. Each succeeding layer is similarly cut off at successively greater distances from the end of the pipe. This is illustrated by the widening black line in FIG. 2 which increases in width at successively greater distances from the end of the pipe. The scale of the drawing is too small to show the strips individually and in cross section. By staggering the ends of the successive steel strips, load is distributed to the joint at the end of the pipe over an appreciable distance instead of at a single location where stress concentrations could damage the pipe when loaded by pressure or otherwise.

It will also be noted that all of the steel strips end at a distance from the end of the pipe so that the steel strips are completely embedded in the fiber reinforced resin. The surrounding epoxy shields the steel from corrosive media that may be present inside or outside of the pipe.

In an exemplary embodiment where the steel strips are each about 10 cm wide, the end of the innermost strip is about 2.5 cm from the end of the pipe. Each successive steel strip ends about 5 cm, or half the width of the strip, away from the end of the pipe.

After the inner and outer layers of fiber reinforced resin and the embedded steel strips are wound, the pipe joint moiety is added over these layers at the end of the pipe. Additional layers of glass fiber rovings wetted with epoxy are wound over the outside of the pipe to build up sufficient thickness to machine the finished geometry of the pipe joint. Typically the fibers are wound at a helix angle of about 700 to 800 with some outer wraps being substantially circumferential. In an exemplary embodiment with a nominal 25 cm diameter pipe, the diameter of the thickest portion of the built up windings from which the joint is made is as much as 34 cm. The end 41 of the added fiber reinforced composite is gradually feathered to the smaller diameter of the principal length of the pipe either in the process of winding or by machining after winding is completed. Feathering of the end minimizes stress concentrations adjacent to the joint.

As previously described in the embodiment of fiber reinforced composite pipe without the embedded steel strips, there is a sealing surface 46 near the end of the pipe beyond the end of the key groove. The sealing surface is between O-ring grooves 47 for retaining sealant as it is pumped into the space adjacent the sealing surfaces.

Although limited embodiments of pipe joint constructed according to principles of this invention have been described and illustrated herein, it will be understood that many modifications and variations may be made by those skilled in the art.

It should therefore be understood that within the scope of the appended claims, this invention may be practiced otherwise than as specifically described.

What is claimed is:

1. A composite pipe comprising:
   a fiber reinforced composite pipe including at least one helically wound steel strip embedded in fiber reinforced resin and having an external joint moiety extending at least in part longitudinally on at least one end of the pipe; and wherein the helically wound steel strip ends within the longitudinal extent of the pipe joint moiety the end of the steel strip is cut off at the helix angle of the strip winding so that the cut edge is parallel to the end of the pipe and the end of the steel strip is spaced apart from the end of the pipe so as to be completely encased by fiber reinforced resin.

2. A composite pipe as recited in claim 1 wherein the end of the steel strip is also cut off so that there is no sharp point at the end of the strip.

3. A composite pipe comprising:
   a fiber reinforced composite pipe including a plurality of helically wound steel strips embedded in fiber reinforced resin and having an external joint moiety extending at least in part longitudinally on at least one end of the pipe; and wherein the helically wound steel strips each end within the longitudinal extent of the pipe joint moiety at differing distances from the end of the pipe and the end of each steel strip is cut off at the helix angle of the strip winding so that the cut edge is parallel to the end of the pipe.

4. A composite pipe as recited in claim wherein the end of each of the steel strips is also cut off so that there is no sharp point at the end of the strip.

5. A composite pipe comprising:
   a fiber reinforced composite pipe including at least one helically wound steel strip embedded in fiber reinforced resin and having an external joint moiety extending at least in part longitudinally on at least one end of the pipe; and wherein the helically wound steel strip ends within the longitudinal extent of the pipe joint moiety and the end of the steel strip is cut off at the helix angle of the strip winding so that the cut edge is parallel to the end of the pipe.

6. A composite pipe as recited in claim 5 wherein the end of the steel strip is also cut off so that there is no sharp point at the end of the strip.

7. A composite pipe comprising:
   a fiber reinforced composite pipe including at least one helically wound steel strip embedded in fiber reinforced resin and having an external joint moiety extending at least in part longitudinally on at least one end of the pipe; and wherein the helically wound steel strip ends within the longitudinal extent of the pipe joint moiety and the end of the steel strip is spaced apart from the end of the pipe so as to be completely encased by fiber reinforced resin.

8. A composite pipe as recited in claim 7 wherein the pipe includes a plurality of helically wound steel strips embedded in the fiber reinforced resin and each of the steel strips ends at a different distance from the end of the pipe joint.

9. A composite pipe comprising:
   a fiber reinforced composite pipe including a plurality of helically wound steel strips embedded in fiber reinforced resin and having an external joint moiety extending at least in part longitudinally on at least one end of the pipe; and wherein the helically wound steel strips each end within the longitudinal extent of the pipe joint moiety at differing distances from the end of the pipe.

10. A composite pipe as recited in claim 9 wherein the ends of the steel strips are all spaced apart from the end of the pipe so as to be completely encased by fiber reinforced resin.

* * * * *

UNITED STATES PATENT AND TRADEMARK OFFICE
CERTIFICATE OF CORRECTION

PATENT NO. : 5,785,092          Page 1 of 2
DATED     : July 28, 1998
INVENTOR(S): Ralph Friedrich; Ming Kuo; Kevin Smyth It is certified that error appears in the above-indentified patent and that said Letters Patent is hereby corrected as shown below:

On title page, item

[56] References Cited, U.S. PATENT DOCUMENTS, replace
"2,640,501  2/1953  Scott et al...138/56" with
-- 2,640,501  6/1953  Scott et al...138/56 --

Insert the following references:
U.S. PATENT DOCUMENTS

| | | | |
|---|---|---|---|
| 10,877 | 10/1887 | Wilbur | |
| 170,473 | 11/1875 | Flagler et al. | |
| 3,058,493 | 10/1962 | Muller | 138/133X |
| 3,062,568 | 11/1962 | Andressen et al. | 285/333 |
| 3,353,563 | 11/1967 | Hutton | 138/39 |
| 3,606,401 | 9/1971 | Schwarz | 285/297X |
| 4,157,101 | 6/1979 | Ross | 138/133X |
| 4,174,124 | 11/1979 | Dockree | 285/54 |
| 4,491,351 | 1/1985 | Galle, Jr. et al | 285/318 |
| 5,213,379 | 5/1993 | Taniguchi et al | 285/423X |
| 5,233,737 | 8/1993 | Policelli | 285/423X |
| 5,279,596 | 1/1994 | Castaneda et al | 138/133X |
| 5,350,202 | 9/1994 | Fritz et al | 285/423X |
| 5,398,975 | 3/1995 | Simmons | 285/333X |

Foreign Patent Documents, replace "WO94 413993  6/1994  WIPO ."
with -- WO94/13993  6/1994  WIPO . --.

UNITED STATES PATENT AND TRADEMARK OFFICE
CERTIFICATE OF CORRECTION

PATENT NO. : 5,785,092
DATED : July 28, 1998
INVENTOR(S) : Ralph Friedrich; Ming Kuo; Kevin Smyth It is certified that error appears in the above-indentified patent and that said Letters Patent is hereby corrected as shown below:

Column 3, line 5, replace "firmly on the pipe" with --placed on the external taper --.
Column 3, line 58, replace "(about 50 gm)" with -- (about 50 µm) --.
Column 3, line 60, change "glass, fiber" to -- glass fiber --.
Column 4, line 44, replace "about 700 to 800" with -- about 70° to 80° --.
Column 5, line 8, after "moiety" insert a comma.
Column 5, line 28, replace "in claim wherein" with -- in claim 3 wherein --.

Signed and Sealed this

Seventh Day of September, 1999

Attest:

Q. TODD DICKINSON

Attesting Officer

Acting Commissioner of Patents and Trademarks